(12) United States Patent
Feng

(10) Patent No.: US 8,210,068 B2
(45) Date of Patent: Jul. 3, 2012

(54) ROTATION MECHANISM AND ROBOT USING THE SAME

(75) Inventor: Yong Feng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 336 days.

(21) Appl. No.: 12/650,510

(22) Filed: Dec. 30, 2009

(65) Prior Publication Data

US 2011/0100145 A1    May 5, 2011

(30) Foreign Application Priority Data

Nov. 5, 2009   (CN) .......................... 2009 1 0309355

(51) Int. Cl.
*B25J 17/00* (2006.01)
*B25J 17/02* (2006.01)
*B25J 18/00* (2006.01)

(52) U.S. Cl. .......................... 74/490.05; 901/14; 901/18

(58) Field of Classification Search .............. 74/490.01, 74/490.05, 469, 471 XY; 901/14, 18; 403/52, 403/53, 57, 66, 69, 79, 119, 150
See application file for complete search history.

(56) References Cited

U.S. PATENT DOCUMENTS

| | | | | |
|---|---|---|---|---|
| 4,790,718 A * | 12/1988 | Vickers | .......................... | 414/735 |
| 5,484,219 A * | 1/1996 | Drew et al. | ..................... | 403/57 |
| 6,086,283 A * | 7/2000 | Ziegert | ............................ | 403/57 |
| 6,543,987 B2 * | 4/2003 | Ehrat | ............................ | 414/735 |
| 6,648,583 B1 * | 11/2003 | Roy et al. | ..................... | 414/735 |
| 6,840,127 B2 * | 1/2005 | Moran | ....................... | 74/490.04 |
| 2009/0301253 A1 * | 12/2009 | Nishida et al. | ............. | 74/490.01 |

* cited by examiner

*Primary Examiner* — Justin Krause
(74) *Attorney, Agent, or Firm* — Altis Law Group, Inc.

(57) ABSTRACT

A rotation mechanism includes a flange, a shaft, a first swing member, and a second swing member. The shaft extends along a first axis. The first swing member is rotatably connected to and received in the flange around a second axis substantially perpendicular to the first axis. The second swing member is rotatably connected to and received in the first swing member around a third axis substantially perpendicular to the first axis and the second axis. The shaft extends through the flange, the first swing member, and the second swing member. The shaft is non-rotatably and slidably received in the second swing member. A robot using the rotation mechanism is also provided.

6 Claims, 5 Drawing Sheets

ROTATION MECHANISM AND ROBOT USING THE SAME

BACKGROUND

1. Technical Field

The present disclosure generally relates to rotation mechanisms, and particularly, to a rotation mechanism capable of swinging and a robot applying the rotation mechanism.

2. Description of Related Art

Parallel robots have advantages of stability, load-bearing, favorable weight to load ratio, dynamic characteristics, and others. As parallel robots and series robots cooperate, they may be used in many fields. Delta robots are typically parallel robots with three degrees of freedom, with simpler, more compact structure and favorable dynamic characteristics.

A typical delta robot includes a base, a movable platform, a shaft and three control arms. The shaft and the control arms connect the movable platform and the base. Opposite ends of the shaft are ball-pivoted on the base and the movable platform, respectively. Opposite ends of each control arm are pivoted to the base and movable platform. During use, an electric motor drives the arms and thus, the shaft, to move. As such, the movable platform moves in three dimensional space. However, movement range of the control arms and the movable platform are limited by a length of the shaft.

Therefore, a rotation mechanism and a robot applying the same are desired to overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
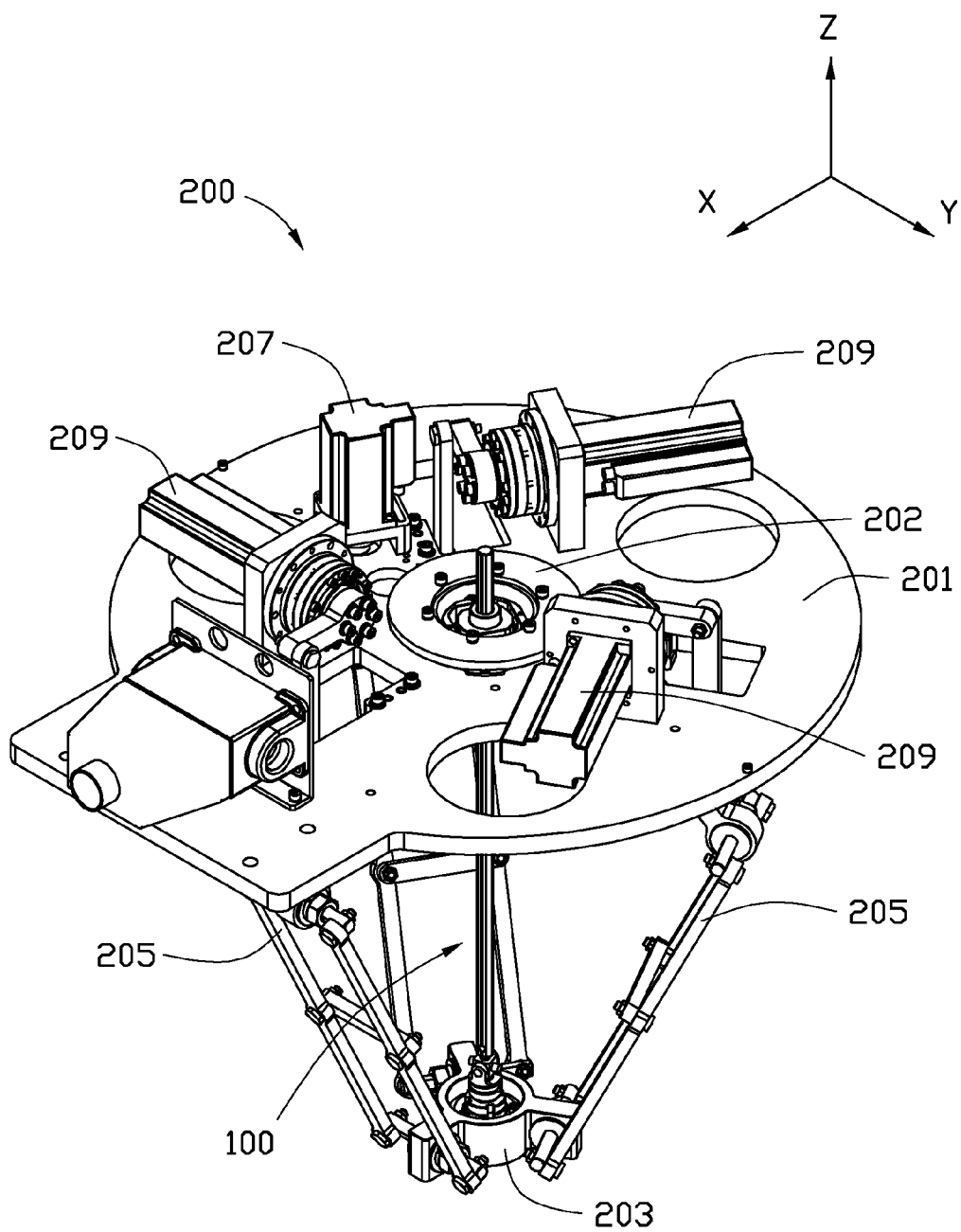
FIG. 1 is a schematic view of a robot of an embodiment of the disclosure, the robot including a rotation mechanism.

Referring to FIG. 1, an embodiment of a robot 200 is shown. The robot 200 is a parallel robot with four degrees of freedom. The robot 200 includes a base 201, a movable platform 203, three control arms 205 rotatably connecting the base 201 with the movable platform 203, and a rotation mechanism 100. The base 201 further includes a first actuator 207 and a gear 202. The first actuator 207 and the gear 202 are mounted on the base 201. The gear 202 can be driven by the first actuator 207. In the illustrated embodiment, the first actuator 207 is a servo motor.

The rotation mechanism 100 includes a flange 10 fixed to the gear 202 and a shaft 90 extending through the flange 10; and the rotation mechanism 100 has one end movably connected to the movable platform 203. The robot 200 further comprises three second actuators 209 connected to the control arms 205, respectively, to drive the control arms 205. During operation, the second actuators 209 drive the control arms 205 to make swinging maneuvers, thus providing movement to the movable platform 203 on X, Y, Z axes. It can be understood that the movable platform 203 may only move in one, two, or all three of the described axes.

Figure 2:
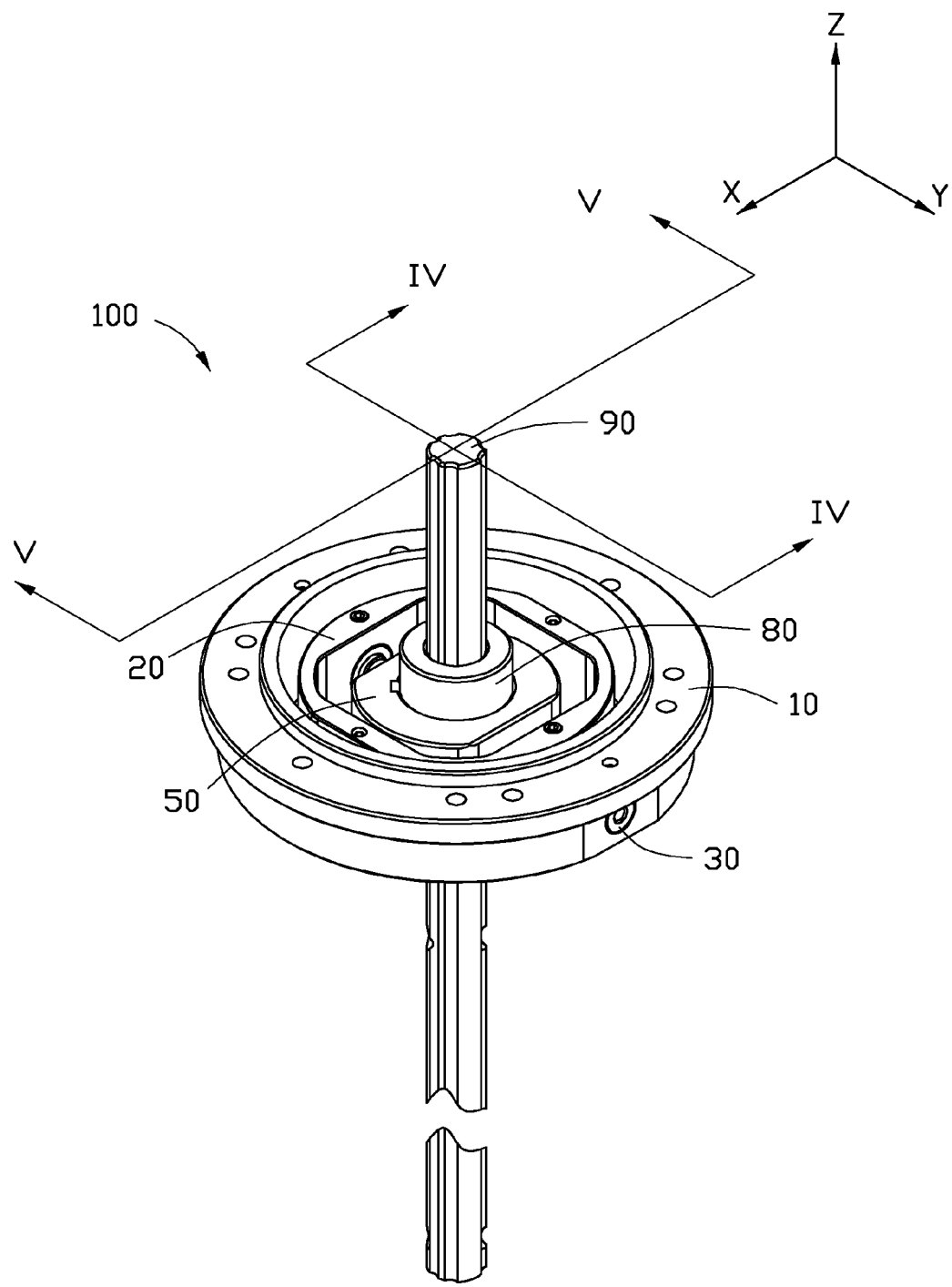
FIG. 2 is an assembled, isometric view of a rotation mechanism, applicable in a robot, such as, for example, that of FIG. 1.
Figure 3:
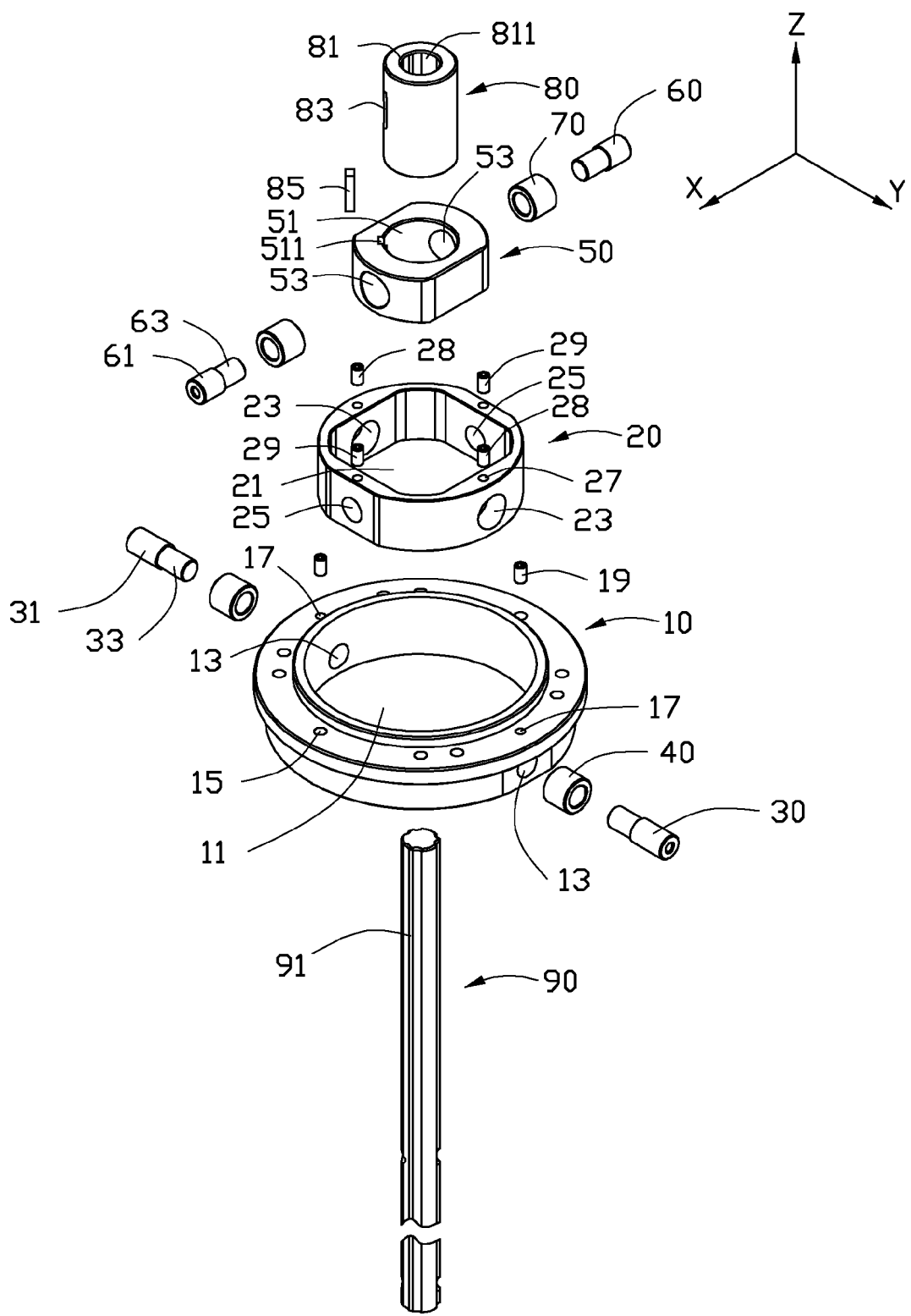
FIG. 3 is an exploded, isometric view of the rotation mechanism of FIG. 1.

Referring to FIG. 2 and FIG. 3, the rotation mechanism 100 further includes a first swing member 20, two first pivots 30, a second swing member 50, and two second pivots 60.

The flange 10 is annular and includes a first receiving hole 11 for receiving the first swing member 20. The flange 10 defines two circular first shaft holes 13 in a sidewall thereof, and the first shaft holes 13 are aligned with the same axis, such as the Y axis in the illustrated embodiment. The first shaft holes 13 are for receiving the first pivots 30 and are communicated with the first receiving hole 11. The flange 10 further defines a plurality of uniformly distributed mounting holes 15 and two locking holes 17 in the top of the flange 10. Each locking hole 17 communicates with one corresponding first shaft hole 13 and has an axis substantially perpendicular to the first shaft hole 13. The mounting holes 15 are configured to fix the flange 10 to the gear 202.

The first swing member 20 is substantially annular. The first swing member 20 defines a second receiving hole 21, two second shaft holes 23, two pivot holes 25, and four receiving holes 27. The second shaft holes 23 and the pivot holes 25 are defined in a sidewall of the first swing member 20. The second shaft holes 23, communicated with the second receiving hole 21, are aligned with the same axis, such as the Y axis in the illustrated embodiment. The pivot holes 25 are aligned in the same axis and have an axis substantially perpendicular to that of the second shaft holes 23. The receiving holes 27 are defined in a top of the first swing member 20; and each receiving hole 27 communicates with one of the second shaft holes 23 and the pivot holes 25. The first swing member 20 is rotatably received in the first receiving hole 11 around the first pivots 30.

The first pivots 30 are cylindrical, each having two portions with different diameters. Each first pivot 30 includes a latching portion 31 and a rotating portion 33 smaller than the latching portion 31. The latching portion 31 is fixed in one of the first shaft holes 13. In order to prevent the first pivot 30 from rotating in the flange 10, the rotation mechanism 100 further includes two first locking members 19. The first locking member 19 is received in the locking hole 17, and resisting the latching portion 31 of the first pivot 30. In the illustrated embodiment, the first locking member 19 is a socket screw.

The rotation mechanism 100 further includes two first tubes 40 fixed in the second shaft holes 23 of the first swing member 20. The first tubes 40 are rotatably sleeved on the rotating portions 33 of the first pivots 30. In order to prevent the first tubes 40 from rotating relative to the first swing member 20, the rotation mechanism 100 further includes two second locking members 28. The second locking member 28 has a structure similar to the first locking member 19. The second locking member 28 is received in the receiving hole 27, and resisting the first tube 40. In the illustrated embodiment, the second locking member 28 is a socket screw.

The second swing member 50 is substantially annular. The second swing member 50 defines a circular third receiving hole 51 and two third shaft holes 53 having axes substantially perpendicular to that of the third receiving hole 51. The third shaft holes 53, communicated with the third receiving hole 51, are defined in a sidewall of the second swing member 50 and are aligned with the same axis, such as the X axis in the illustrated embodiment. The second swing member 50 further defines a key slot 511 in the sidewall and communicating with the third receiving hole 51. The second swing member 50 is rotatable around the second pivots 60 in the second receiving hole 21 of the first swing member 20.

The second pivots 60 have a structure similar to the first pivots 30. Each second pivot 60 includes a latching portion 61 and a rotating portion 63 smaller than the latching portion 61. The latching portion 61 is fixed in one of the pivot holes 25. In order to prevent the second pivot 60 from rotating in the pivot hole 25 of the first swing member 20, the rotation mechanism 100 further includes two third locking members 29. The third locking member 29 has a structure similar to the first locking member 19. The third locking member 29 is received in the receiving hole 27, and resisting the latching portion 61 of the second pivot 60. In the illustrated embodiment, the third locking member 29 is a socket screw.

The rotation mechanism 100 further includes two second tubes 70 fixed in the third shaft holes 53 of the second swing member 50. The second tubes 70 have a structure similar to the first tubes 40. The second tubes 70 are rotatably sleeved on the rotating portions 63 of the second pivots 60.

The rotation mechanism 100 further includes a sleeve 80 fixed in the third receiving hole 51 of the second swing member 50. The sleeve 80 defines a positioning hole 81 and a key slot 83. The key slot 83 is defined in an outer surface of the sleeve 80. The sleeve 80 further defines a spline slot 811 along the axial direction of the positioning hole 81. The rotation mechanism 100 further includes a key 85 received in the key slot 511 of the second swing member 50 and the key slot 83 of the sleeve 80, thus preventing the sleeve 80 from rotating relative to the second swing member 50.

The shaft 90 defines a spline slot 91 to engage with the spline slot 811 of the sleeve 80, thus preventing the shaft 90 from rotating relative to the sleeve 80. The shaft 90 is slidable along an axis of the sleeve 80. Thus, the shaft 90 is non-rotatably and slidably received in the second swing member 50.

Figure 4:
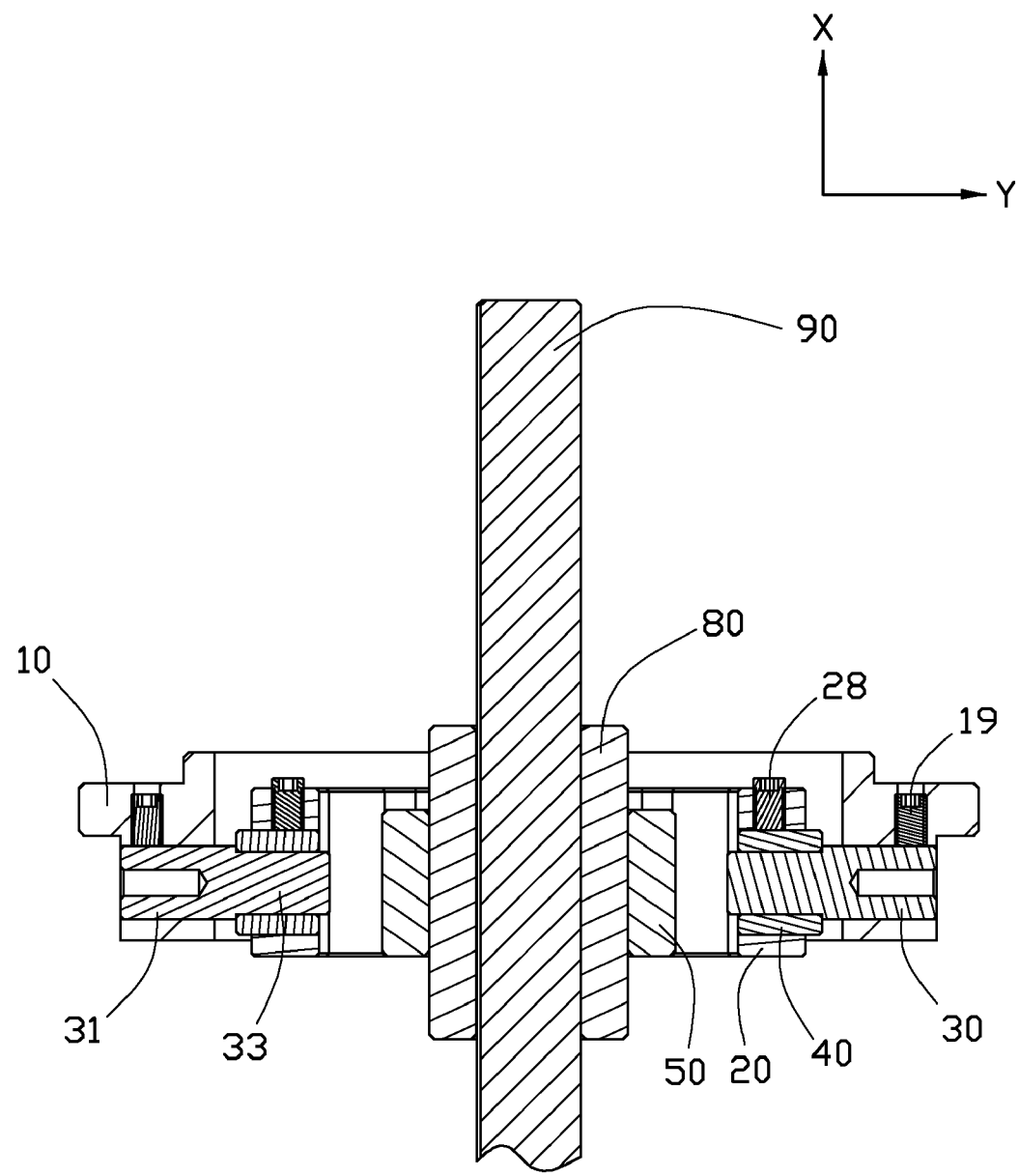
FIG. 4 is a cross-section of the rotation mechanism taken along line IV-IV of FIG. 2.
Figure 5:
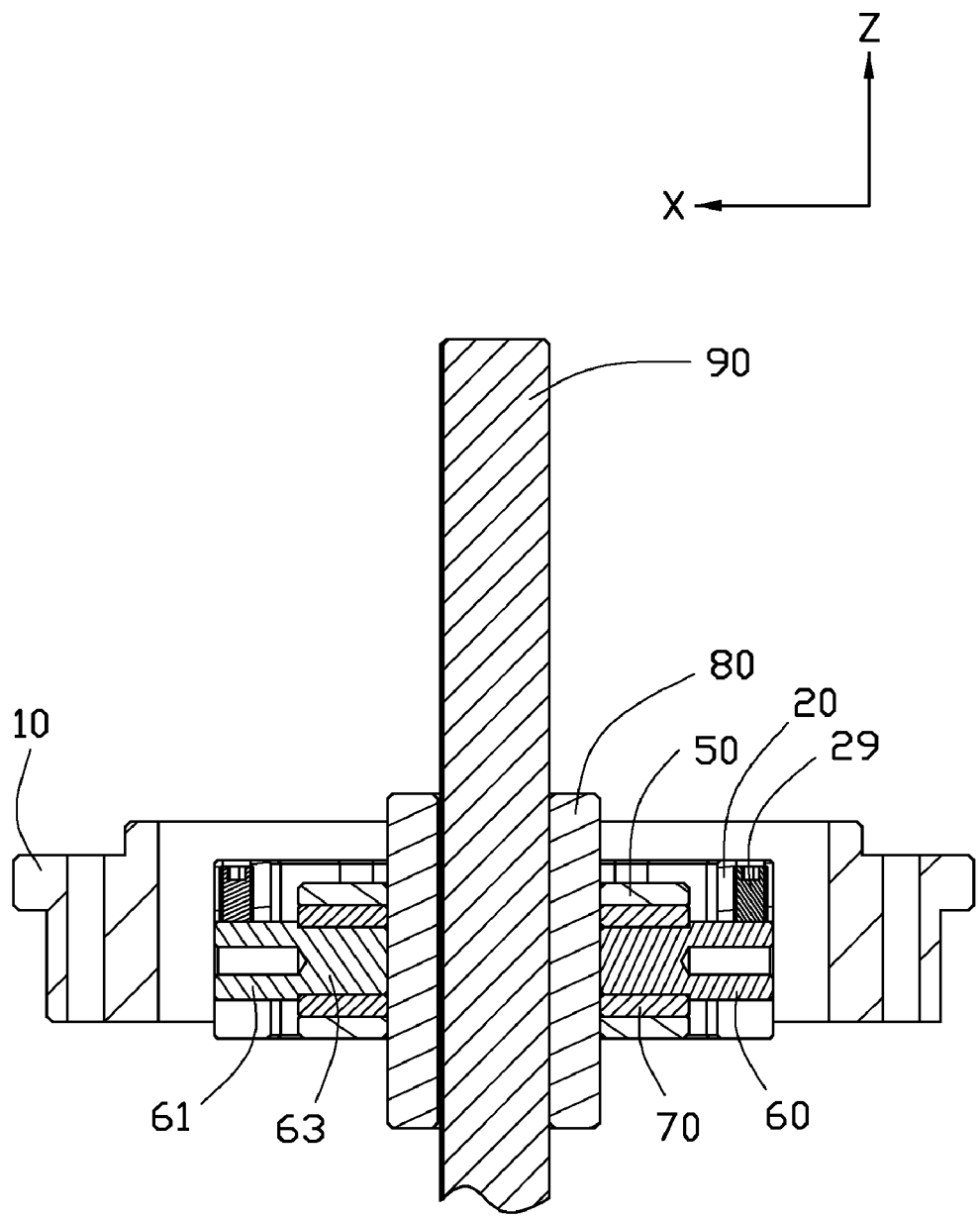
FIG. 5 is a cross-section of the rotation mechanism taken along line V-V of FIG. 2.

Referring to FIG. 4 and FIG. 5, during assembly of the rotation mechanism 100, the sleeve 80 is received in the third receiving hole 51 of the second swing member 50 and fixed to the second swing member 50 via the key 85. The second tubes 70 are received in and fixed in the third shaft holes 53 of the second swing member 50. The second swing member 50 is received in the second receiving hole 21 of the first swing member 20. Each second pivot 60 runs through one second tube 70, one pivot hole 25 and is received in the third receiving hole 53. The third locking members 29 are received in two opposite receiving holes 27, and resisting the second pivots 60. Thereby, the second swing member 50 is pivoted in the first swing member 20 via the second pivots 60. The first swing member 20 is received in the first receiving hole 11. Each first pivot 30 runs through one first tube 40, one first shaft hole 13 of the flange 10, and is received in the second receiving hole 21 of the first swing member 20. The second locking members 28 are received in another two opposite receiving holes 27, and resisting the first tube 40. The first locking members 19 are received in the locking holes 17, and resisting the first pivots 30. Thereby, the first swing member 20 is pivoted in the flange 10 via the first pivots 30. The shaft 90 is positioned in the positioning hole 81 of the sleeve 80, and the assembly of the rotation mechanism 100 is complete.

When the rotation mechanism 100 is applied to the robot 200, the flange 10 is fixed on the gear 202, and a bottom end of the shaft 90 is movably connected to the movable platform 203.

In operation, as shown in FIG. 1, in an original state of the robot 200, the movable platform 203 is directly under the base 201 and the shaft 90 is substantially perpendicular to the flange 10. When the robot 200 is in operating mode, the control arms 205 are swung by the second actuators 209 to move the movable platform 203 relative to the base 201, thus the shaft 90 is angled with respect to the flange 10. When the shaft 90 is angled with respect to the flange 10, the first swing member 20 and the second swing member 50 are rotatable around the X axis and Y axis, respectively, allowing the shaft 90 to swing relative to the flange 10. The shaft 90 is slidable in sleeve 80, allowing displacement of the movable platform 203 relative to the flange 10 for moving of the movable platform 203. The first actuator 207 rotates the gear 202 to rotate the flange 10, thus the first swing member 20, the second swing member 50, the sleeve 80, and the shaft 90 also rotate. As such, the rotation of the first actuator 207 is transmitted to a tool (not shown) mounted on the movable platform 203.

The robot 200 has a wide range of movement and is more flexible since the shaft 90 is not only rotatable with respect to the flange 10, but the shaft 90 also can swing on the X axis and Y axis, and slide along the sleeve 80. In addition, the shaft 90 and the sleeve 80 are generally available off-the-shelf components, thus providing higher interchangeability, longer service time, and higher precision.

Alternatively, the first, second, third locking members 19, 28, 29 and the key 85 may be omitted. The first tubes 40 and the second tubes 70 may be omitted. If the sleeve 80 is replaced by a linear bearing, the spline slot 91 may be omitted. The sleeve 80 may be omitted when the spline slot 811 is defined in the second swing member 50. The movement of the first actuator 207 may be transmitted to the flange 10 via other structures. The driving method for driving the flange 10 by the first actuator 207 is not limited to gear transmission but also includes belt transmission.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A rotation mechanism for a robot, comprising:
a flange;
a shaft extending along a first axis;
a first swing member rotatably connected to and received in the flange around a second axis substantially perpendicular to the first axis; and
a second swing member rotatably connected to and received in the first swing member around a third axis substantially perpendicular to the first axis and the second axis;
wherein the shaft extends through the flange, the first swing member, and the second swing member; and the shaft is non-rotatably and slidably received in the second swing member.

2. The rotation mechanism of claim 1 further comprising two first pivots and two second pivots; wherein the flange defines two first shaft holes aligned with the second axis, the first swing member defines two second shaft holes aligned with the second axis, each first pivot is received in one first shaft hole and one second shaft hole to rotatably connect the shaft with the first swing member; the first swing member defines two pivot holes aligned with the third axis, the second swing member defines two third shaft holes aligned with the third axis, and each second pivot is received in one pivot hole and one third shaft hole to rotatably connect the second swing member with the first swing member.

3. The rotation mechanism of claim 2, wherein the flange defines a first receiving hole to receive the first swing member, the first swing member defines a second receiving hole to receive the second swing member, and the second swing member defines a third receiving hole to receive the shaft.

4. The rotation mechanism of claim 2, wherein each of the first pivots and the second pivots comprises a latching portion and a rotating portion smaller than the latching portion; the rotation mechanism further comprises two first tubes and two second tubes, the first tubes rotatably sleeved on the rotating portions of the first pivots and the second tubes rotatably sleeved on the rotating portions of the second pivots.

5. The rotation mechanism of claim 4, wherein the flange defines two locking holes with axes parallel to the first axis, the first swing member defines four receiving holes parallel to the first axis; the rotation mechanism further comprises a plurality of locking members; two locking members engage the locking holes and resist the latching portions of the first pivots, two locking members engage two receiving holes and resist the first tubes, two locking members engage another two receiving holes and resist the latching portions of the second pivots.

6. The rotation mechanism of claim 1 further comprising a sleeve fixed in the second swing member, the shaft being non-rotatably and slidably received in the sleeve.

* * * * *